US012661764B2

(12) United States Patent
Nakahara et al.

(10) Patent No.: US 12,661,764 B2
(45) Date of Patent: Jun. 23, 2026

(54) IMPACT ROTARY TOOL, TORQUE ESTIMATION METHOD, AND NON-TRANSITORY RECORDING MEDIUM

(71) Applicant: Panasonic Intellectual Property Management Co., Ltd., Osaka (JP)

(72) Inventors: Masayuki Nakahara, Osaka (JP); Soichiro Yamada, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 263 days.

(21) Appl. No.: 18/361,503

(22) Filed: Jul. 28, 2023

(65) Prior Publication Data

US 2024/0058929 A1 Feb. 22, 2024

(30) Foreign Application Priority Data

Aug. 22, 2022 (JP) ................................ 2022-132123

(51) Int. Cl.
*B25B 23/147* (2006.01)
*B25B 21/02* (2006.01)
(Continued)

(52) U.S. Cl.
CPC .......... *B25B 23/1475* (2013.01); *B25B 21/02* (2013.01); *B25D 16/00* (2013.01); *B25D 17/00* (2013.01)

(58) Field of Classification Search
CPC ..... B25B 21/002; B25B 21/008; B25B 21/02; B25B 21/023; B25B 21/026; B25B 23/14; B25B 23/1405; B25B 23/147; B25B 23/1475; B25F 5/00; B25D 16/00; B25D 16/006; B25D 17/00; B25D 17/06
See application file for complete search history.

(56) References Cited

U.S. PATENT DOCUMENTS

| | | | |
|---|---|---|---|
| 2005/0263304 A1 | 12/2005 | Sainomoto et al. | |
| 2018/0290613 A1 | 10/2018 | Yamaguchi | |
| 2021/0394344 A1* | 12/2021 | Mueckl | B25B 21/026 |

FOREIGN PATENT DOCUMENTS

| | | |
|---|---|---|
| CN | 108188968 * | 6/2018 |
| CN | 108188968 A | 6/2018 |

(Continued)

OTHER PUBLICATIONS

Extended European Search Report dated Jan. 9, 2024 issued in the corresponding European Patent Application No. 23188328.1.

(Continued)

*Primary Examiner* — Robert J Scruggs
(74) *Attorney, Agent, or Firm* — Rimon P.C.

(57) ABSTRACT

An impact rotary tool includes a driver, a drive shaft, a hammer, an anvil, a travel distance measuring device, and a torque estimator. The driver is configured to perform a turning operation. The travel distance measuring device is configured to measure a parameter relating to a hammer travel distance through which on application of impact to the anvil by the hammer, the hammer moves away from the anvil along an axial direction from a location of the application of the impact to the anvil by the hammer. The torque estimator is configured to estimate, based on at least the parameter relating to the hammer travel distance, a torque value generated by the impact.

7 Claims, 4 Drawing Sheets

(51) Int. Cl.

| | |
|---|---|
| ***B25D 16/00*** | (2006.01) |
| ***B25D 17/00*** | (2006.01) |

(56) References Cited

FOREIGN PATENT DOCUMENTS

| | | | |
|---|---|---|---|
| CN | 108688597 | A | 10/2018 |
| JP | 2001-277146 | A | 10/2001 |
| JP | 2005-324265 | A | 11/2005 |

OTHER PUBLICATIONS

Notice of Reasons for Refusal dated Sep. 2, 2025 issued in the corresponding Japanese Patent Application No. 2022-132123, with English translation.

Office Action dated Apr. 27, 2026 issued in the corresponding Chinese Patent Application No. 202310892273.0, with English translation.

* cited by examiner

IMPACT ROTARY TOOL, TORQUE ESTIMATION METHOD, AND NON-TRANSITORY RECORDING MEDIUM

CROSS-REFERENCE TO RELATED APPLICATION

The present application is based upon and claims the benefit of priority to Japanese Patent Application No. 2022-132123, filed on Aug. 22, 2022, the entire contents of which are incorporated herein by reference.

TECHNICAL FIELD

The present disclosure generally relates to impact rotary tools, torque estimation methods, and non-transitory recording media. The present disclosure specifically relates to an impact rotary tool, a torque estimation method, and a non-transitory recording medium which are configured to estimate a torque value.

BACKGROUND ART

Patent Literature 1 (JP 2005-324265 A) discloses an impact rotary tool including a rotary driving mechanism, an output shaft, a processor, a rotation speed setting unit, and a controller. The rotary driving mechanism rotates a hammer via a drive shaft. To the output shaft, driving force is applied by an impact blow of the hammer. The processor calculates a fastening torque from the impact blow of the hammer. The rotation speed setting unit changes the rotational velocity of the rotary driving mechanism. The controller rotates the rotary driving mechanism in a rotational velocity set in the rotation speed setting unit and stops the rotary driving mechanism when the fastening torque calculated in the processor becomes greater than or equal to a fastening torque value set in advance in a torque setting unit.

The impact rotary tool as described above calculates the fastening torque value (torque value) on the basis of the rotational velocity of the rotary driving mechanism and the number of impact blows of the hammer. However, the fastening torque value may be different depending on the type of a fastening member (e.g., a screw, a bolt, a nut) even with the same number of impact blows of the hammer and the same rotational velocity. That is, an impact rotary tool configured to accurately estimate the fastening torque value is in demand.

SUMMARY

It is an object of the present disclosure to provide an impact rotary tool, a torque estimation method, and a non-transitory recording medium which are configured to accurately estimate a torque value.

An impact rotary tool according to an aspect of the present disclosure includes a driver, a drive shaft, a hammer, an anvil, a travel distance measuring device, and a torque estimator. The driver is configured to perform a turning operation. The drive shaft is configured to be turned by the driver. The hammer is configured to be fitted to an outer perimeter of the drive shaft such that the hammer is movable in an axial direction of the drive shaft and rotatable in a turning direction in which the drive shaft turns. The anvil is configured to receive impact applied by the hammer in the turning direction. The travel distance measuring device is configured to measure a parameter relating to a hammer travel distance through which on application of the impact to the anvil by the hammer, the hammer moves away from the anvil along the axial direction from a location of the application of the impact to the anvil by the hammer. The torque estimator is configured to estimate, based on at least the parameter, a torque value generated by the impact.

A torque estimation method according to an aspect of the present disclosure is a torque estimation method of estimating a torque value generated by impact applied by an impact rotary tool including a driver, a drive shaft, a hammer, and an anvil. The driver is configured to perform a turning operation. The drive shaft is configured to be turned by the driver. The hammer is configured to be fitted to an outer perimeter of the drive shaft such that the hammer is movable in an axial direction of the drive shaft and rotatable in a turning direction in which the drive shaft turns. The anvil is configured to receive impact applied by the hammer in the turning direction. The torque estimation method includes a travel distance measurement step and a torque estimation step. The travel distance measurement step includes measuring a parameter relating to a hammer travel distance through which on application of the impact to the anvil by the hammer, the hammer moves away from the anvil along the axial direction from a location of the application of the impact to the anvil by the hammer. The torque estimation step includes estimating, based on at least the parameter, a torque value generated by the impact.

A non-transitory recording medium according to an aspect of the present disclosure is a non-transitory recording medium recording a program configured to cause a computer system to execute the torque estimation method.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

Embodiment

(1) Overview

The overview of an impact rotary tool according to the present embodiment will be described below with reference to FIGS. 1 and 2.

Figure 1:
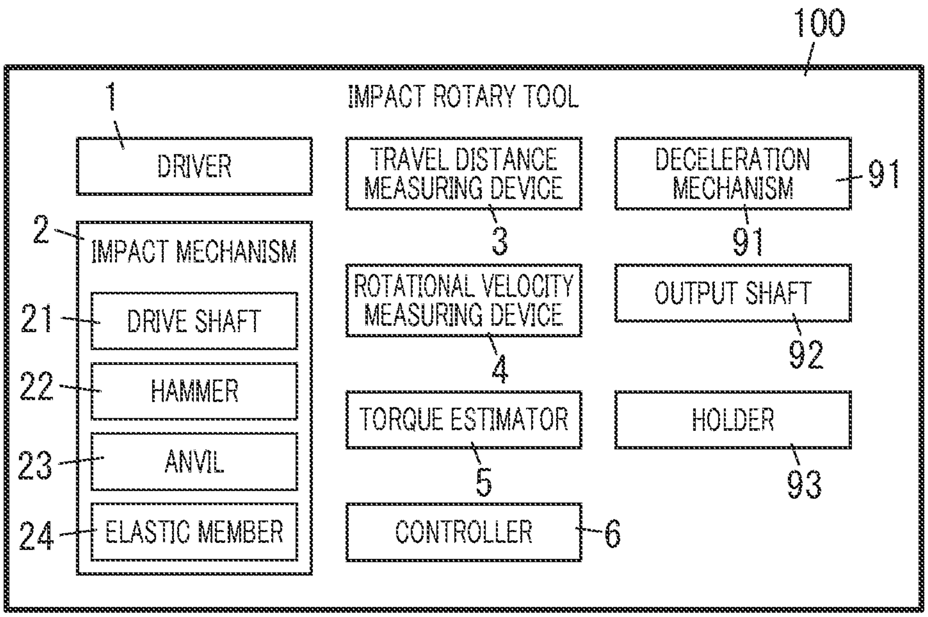
FIG. 1 is a block diagram of a schematic configuration of an impact rotary tool of the present embodiment.
Figure 2:
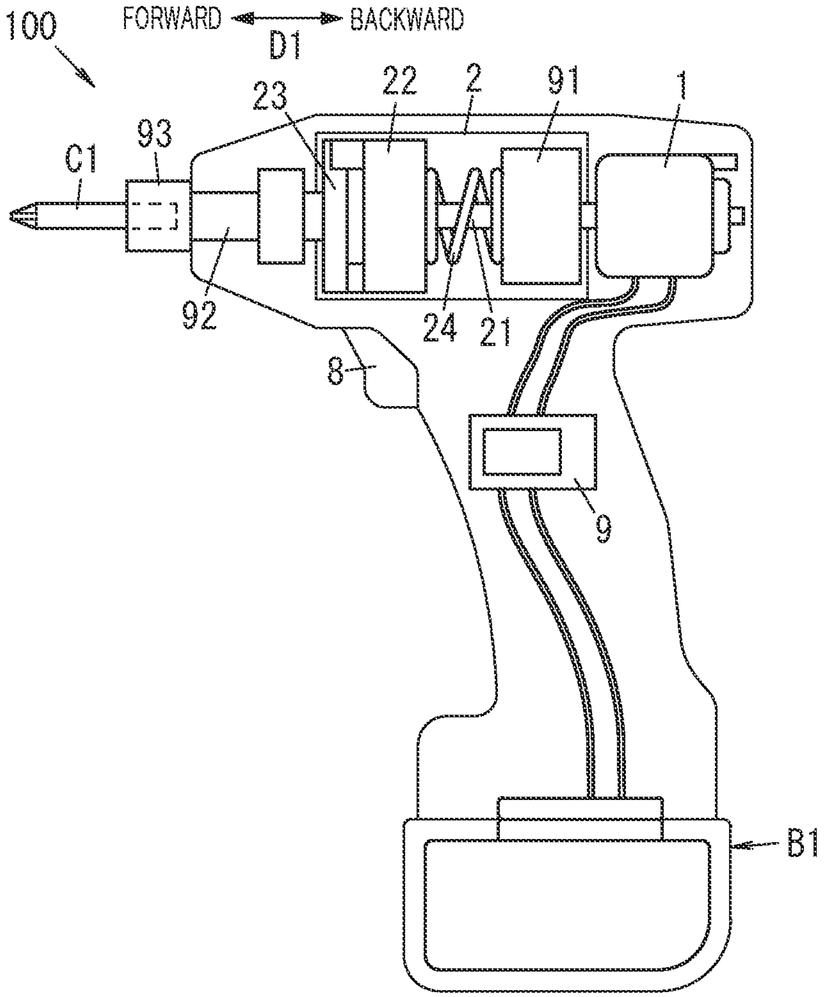
FIG. 2 is a configuration view of a schematic configuration of the impact rotary tool.

As shown in FIGS. 1 and 2, an impact rotary tool 100 according to the present embodiment includes a driver 1, a drive shaft 21, a hammer 22, an anvil 23, a travel distance measuring device 3, and a torque estimator 5. For example, assume a worker uses the impact rotary tool 100 in fastening work of fastening a fastening member (such as a screw, a bolt, or a nut) into a fastening target (such as electronic goods or furniture).

The driver 1 performs a turning operation. The drive shaft 21 is turned by the driver 1. The hammer 22 is fitted to an outer perimeter of the drive shaft 21 such that the hammer 22 is movable in an axial direction of the drive shaft 21 and rotatable in a turning direction in which the drive shaft 21 turns. The anvil 23 receives impact applied by the hammer 22 in the turning direction in which the drive shaft 21 turns.

The travel distance measuring device 3 measures a parameter relating to a hammer travel distance (the magnitude of movement of the hammer 22). The hammer travel distance is a distance through which on application of the impact to the anvil 23 by the hammer 22, the hammer 22 moves away from the anvil 23 along the axial direction D1 (see FIG. 2) of the drive shaft 21 from a location where the hammer 22 applies the impact to the anvil 23. The torque estimator 5 is configured to estimate, based on at least the parameter measured by the travel distance measuring device 3, a torque value generated by the impact. The "torque value" used herein is a value representing the magnitude of a torque generated by impact, that is, a value representing the magnitude of a torque applied to the fastening member.

In general, a difference in the type of the fastening member (such as a metal screw or a wood screw), even when with the same number of times of impact applied by the hammer 22 and with the same rotational velocity, results in different progress of the anvil 23 by the impact applied by the hammer 22 in the rotational direction, and the torque value generated by the impact may thus also be different. Thus, when the torque value is estimated based on the number of times of impact applied by the hammer 22 or the rotational velocity, the difference in the torque value depending on the type of the fastening member cannot be taken into consideration, which makes an accurate estimation of the torque value difficult.

In the impact rotary tool 100 of the present embodiment, however, the torque estimator 5 estimates, based on at least the hammer travel distance, the torque value generated by the impact. When the hammer 22 applies impact to the anvil 23, the hammer 22 moves away from the anvil 23 due to repulsive force of the anvil 23 against the impact. The repulsive force of the anvil 23 against the impact changes in accordance with the progress of the anvil 23 in the rotational direction, and the hammer travel distance thus changes in accordance with the progress of the anvil 23 in the rotational direction. Thus, the impact rotary tool 100 of the present embodiment enables the torque value to be estimated in consideration of the difference in the progress of the anvil 23 in the rotational direction depending on the type of the fastening member. That is, the impact rotary tool 100 of the present embodiment has the advantage of being able to accurately estimate the torque value.

(2) Detailed Configuration

(2-1) Overall Configuration

Detailed configuration of the present embodiment will be described below with reference to FIGS. 1 to 3.

As shown in FIGS. 1 and 2, the impact rotary tool 100 further includes an impact mechanism 2, a rotational velocity measuring device 4, a controller 6, a deceleration mechanism 91, an output shaft 92, and a holder 93 in addition to the driver 1, the travel distance measuring device 3, and the torque estimator 5.

In the following description, the axial direction D1 (see FIG. 2) of the drive shaft 21 described later is defined as a forward/backward direction. The anvil 23 described later is supposed to be located forward of the hammer 22 described later, and the hammer 22 is supposed to be located backward of the anvil 23.

The impact rotary tool 100 preferably includes a computer system. The computer system includes a processor and memory as hardware main components. The processor executes a program stored in the memory of the computer system, thereby implementing at least some of functions of the travel distance measuring device 3, the rotational velocity measuring device 4, the torque estimator 5, and the controller 6 of the present disclosure. The computer system includes, as a main hardware component, the processor which operates in accordance with the program. Any type of processor may be used as long as the function(s) can be implemented by executing a program. The processor includes one or a plurality of electronic circuits including semiconductor integrated circuits (IC) or large-scale integrated circuits (LSI). As used herein, the "integrated circuit" such as an IC or an LSI is called by a different name depending on the degree of integration thereof. Examples of the integrated circuits include a system LSI, a very large-scale integrated circuit (VLSI), and an ultra-large scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation.

(2-2) Driver

The driver 1 performs a turning operation. More specifically, the driver 1 operates by using electric power supplied from a power supply B1 (see FIG. 2), thereby performing the turning operation. As an example, the power supply B1 is a rechargeable battery pack detachably attachable to the impact rotary tool 100. The power supply B1 is not a constituent element of the impact rotary tool 100. However, the impact rotary tool 100 may include the power supply B1 as its constituent element.

The driver 1 is, for example, a brushless motor. In particular, the driver 1 of the present embodiment is a synchronous motor and is specifically a permanent magnet synchronous motor (PMSM). The driver 1 includes: a rotor including a rotary shaft and a permanent magnet; and a stator including armature windings for three phases (a U-phase, a V-phase, and a W-phase).

The torque and the rotational velocity of the driver 1 change in accordance with control by the controller 6. The controller 6 controls a motor current flowing to the driver 1 by electric power supplied from the power supply B1, thereby controlling the torque and the rotational velocity of the driver 1. In the present embodiment, the controller 6 controls the driver 1 in accordance with vector control. More specifically, the controller 6 of the present embodiment performs the vector control by decomposing the motor current into a torque current for generating a torque and an excitation current for generating magnetic flux and individually controlling these current components. That is, the driver 1 is supplied with the torque current and the excitation current in accordance with the vector control performed by the controller 6.

(2-3) Impact Mechanism

The impact rotary tool 100 of the present embodiment performs an operation for fastening work while causing the impact mechanism 2 to perform an impact operation. The impact mechanism 2 generates, based on motive power of the driver 1, impacting force by the impact operation and applies the impacting force to a tip tool C1 (see FIG. 2).

As shown in FIGS. 1 and 2, the impact mechanism 2 includes the drive shaft 21, the hammer 22, the anvil 23, and an elastic member 24.

As shown in FIG. 2, the drive shaft 21 is mechanically connected to a rotary shaft of the driver 1 via the deceleration mechanism 91. The deceleration mechanism 91 converts the rotational velocity and the torque of the rotary shaft of the driver 1 into a rotational velocity and a torque required for an operation of turning a screw. The torque of the rotary shaft of the driver 1 is transmitted via the deceleration mechanism 91 to the drive shaft 21. As a result, the drive shaft 21 turns. The drive shaft 21 is a so-called spindle.

The hammer 22 is fitted to the outer perimeter of the drive shaft 21 such that the hammer 22 is movable in the axial direction D1 of the drive shaft 21 and rotatable in the turning direction in which the drive shaft 21 turns. The rotational power of the drive shaft 21 is transmitted to the hammer 22, and thereby, the hammer 22 rotates, together with the drive shaft 21, in the turning direction in which the drive shaft 21 turns.

The elastic member 24 is disposed between the deceleration mechanism 91 and the hammer 22. The hammer 22 receives, from the elastic member 24, force toward the anvil 23 along the axial direction D1 of the drive shaft 21. In other words, the hammer 22 is urged by the elastic member 24 toward the anvil along the axial direction D1 of the drive shaft 21. The elastic member 24 of the present embodiment is, for example, a conical coil spring.

The anvil 23 includes an engagement portion which is to engage with the hammer 22 in the turning direction. In a state where the hammer 22 and the anvil 23 engage with each other, the rotational power of the hammer 22 is transmitted to the anvil 23. This rotates the anvil 23.

The output shaft 92 of the present embodiment is formed integrally with the anvil 23. The output shaft 92 has a tip end provided with the holder 93. The output shaft 92 transmits the rotational power of the anvil 23 to the holder 93.

The holder 93 holds the tip tool C1. More specifically, the tip tool C1 is detachably attached to the holder 93. Alternatively, the holder 93 and the tip tool C1 may be formed integrally with each other as one piece. In the present embodiment, the output shaft 92 and the tip tool C1 rotate together with the anvil 23.

The tip tool C1 is, for example, a screwdriver bit. The tip tool C1 is fitted to the fastening member. The tip tool C1 fitted to the fastening member turns, thereby enabling machining work of, for example, fastening the fastening member to be done. In the present embodiment, the tip tool C1 is not included in components of the impact rotary tool 100. The tip tool C1, however, may be included in the components of the impact rotary tool 100.

The impact mechanism 2 performs the impact operation when an impact condition relating to the magnitude of the rotational power applied to the anvil 23 from the hammer 22 is satisfied. The impact operation is an operation of applying impacting force from the hammer 22 to the anvil 23. In the present embodiment, the impact condition is that the rotational power of the hammer 22 is greater than or equal to a prescribed value. As the rotational power of the hammer 22 increases, the proportion of the component of force that causes the hammer 22 to retreat increases with respect to the force produced between the hammer 22 and the anvil 23. When the rotational power of the hammer 22 becomes greater than or equal to the prescribed value, the hammer 22 retreats while compressing the elastic member 24. Then, on receiving the force of restitution from the elastic member 24, the hammer 22 advances while rotating. Then, the drive shaft 21 turns by a specified amount (e.g., goes approximately half around), and thus, the hammer 22 collides against the anvil 23. That is, each time the drive shaft 21 turns by the specified amount, the anvil 23 receives impact in the turning direction from the hammer 22. As mentioned in the present disclosure, "to retreat" means to move backward along the forward/backward direction, and "to advance" means to move forward along the forward/backward direction.

As explained above, in the impact mechanism 2, the hammer 22 repeatedly applies impact to the anvil 23 in the turning direction. A torque generated by the impact enables the fastening member to be tightly fastened as compared with the case without the collision.

(2-4) Travel Distance Measuring Device

The travel distance measuring device 3 of the present embodiment measures, as a parameter relating to the hammer travel distance, the hammer travel distance itself. That is, the travel distance measuring device 3 of the present embodiment measures a the hammer travel distance through which on application of the impact to the anvil 23 by the hammer 22, the hammer 22 moves away from the anvil 23 along the axial direction D1 from a location of the application of the impact to the anvil 23 by the hammer 22. More specifically, the hammer travel distance represents a distance by which the hammer 22 retreats from a location of the application of the impact to the anvil 23 by the hammer 22 along the axial direction D1.

In order to explain how the travel distance measuring device 3 of the present embodiment measures the hammer travel distance, a variation amount A1 of a torque current X1 supplied to the driver 1 in accordance with the vector control performed by the controller 6 will be described at first. FIG. 3 shows a change in the torque current X1 with time during a period during which the impact rotary tool 100 performs the operation for the fastening work while causing the impact mechanism 2 to perform the impact operation. The torque current X1 is supplied to the driver 1 in accordance with the vector control performed by the controller 6.

In general, the torque current X1 changes in accordance with the magnitude of a load applied to the driver 1. That is, as the load applied to the driver 1 increases, the torque current X1 increases, whereas as the load applied to the driver 1 decreases, the torque current X1 decreases. Thus, as shown in FIG. 3, the torque current X1 repeats, each time the hammer 22 applies impact to the anvil 23, a variation that the torque current X1 starts increasing from a point of time at which the hammer 22 applies the impact to the anvil 23 and the torque current X1 starts decreasing immediately after a maximum retreat of the hammer 22.

Figure 3:
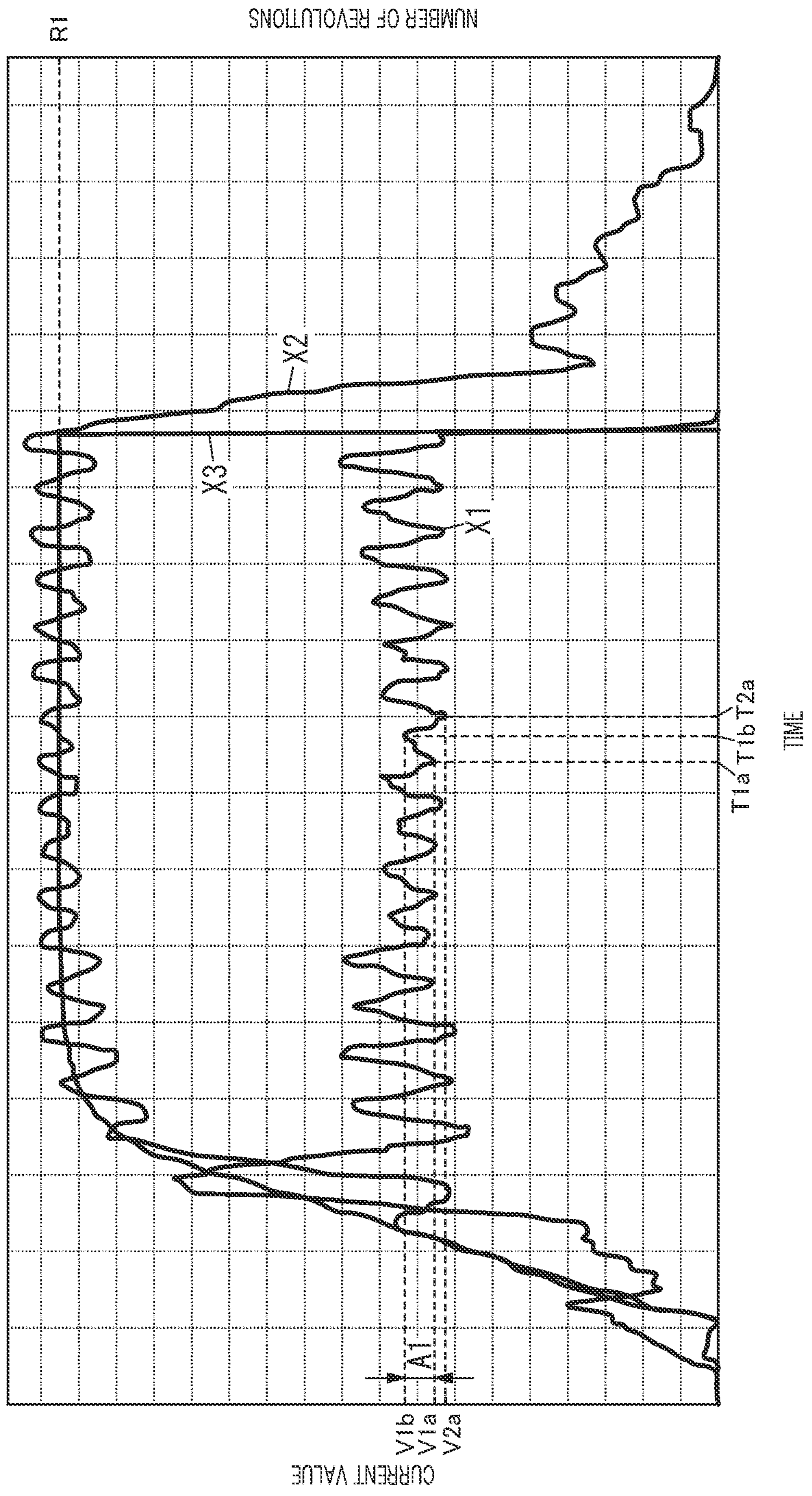
FIG. 3 is an illustrative view of a variation in a torque current in the impact rotary tool with time and a variation in a calculated value of the number of revolutions of a driver and a target value with time.

More specifically, a variation in the torque current X1 caused when the hammer 22 applies impact to the anvil 23 at a time T1*a* and the hammer 22 then applies impact to the anvil 23 at a time T2*a* is explained as an example with reference to FIG. 3. In FIG. 3, a time T1*b* corresponds to a timing of the maximum retreat of the hammer 22.

Before the hammer 22 applies the impact to the anvil 23 at the time T1*a*, the hammer 22 is rotating in a state where the hammer 22 is disengaged from the anvil 23. Since the hammer 22 is not engaged with the anvil 23, the load applied to the driver 1 is low, and the torque current X1 is thus low.

Thereafter, the hammer 22 applies the impact to the anvil 23 at the time Tia, and the hammer 22 is thus disengaged from the anvil 23. During a period from the time T1*a* to the time T1*b*, the hammer 22 retreats while compressing the elastic member 24. While the hammer 22 is retreating, the driver 1 supplies energy to the hammer 22, and therefore, the load applied to the driver 1 increases, and the torque current X1 thus increases. During a period from the time T1*b* to the time T2*a*, the hammer 22 disengaged from the anvil 23 advances while rotating. While the hammer 22 is advancing, the driver 1 supplies no energy to the hammer 22, and therefore, the load applied to the driver 1 decreases, and the torque current X1 thus decreases. Thereafter, after the hammer 22 applies the impact again to the anvil 23 at the time T2*a*, the hammer 22 retreats while the hammer 22 compresses the elastic member 24. While the hammer 22 is retreating, the driver 1 supplies energy to the hammer 22, and therefore, the load applied to the driver 1 increases, and the torque current X1 thus increases. Thus, the torque current X1 when the hammer 22 applies the impact to the anvil 23 at the time T1*a* is a local minimal value V1*a*, and the torque current X1 corresponding to the maximum retreat of the hammer 22 at the time T1*b* is a local maximum value V1*b*. Moreover, the torque current X1 when the hammer 22 applies the impact to the anvil 23 at the time T2*a* is a local minimal value V2*a*. During the period during which the impact rotary tool 100 performs the operation for the fastening work while causing the impact mechanism 2 to perform the impact operation, the torque current X1 repeats the variation explained above each time the hammer 22 applies impact to the anvil 23.

In the present embodiment, the variation amount A1 of the torque current X1 in a period from the time T1*a* at which the hammer 22 applies impact to the anvil 23 to the time T2*a* at which the hammer 22 applies impact to the anvil 23 again is defined as a difference between the local minimal value Via at the time T1*a* and the local maximum value V1*b* at the time T1*b*. In other words, in the present embodiment, the variation amount A1 of the torque current X1 in the period from when the hammer 22 applies impact to the anvil 23 to when the hammer 22 next applies impact to the anvil 23 is defined as a difference between a local minimal value when the hammer 22 applies the impact to the anvil 23 and a local maximum value when the hammer 22 retreats at maximum.

During a period during which the hammer 22 retreats while compressing the elastic member 24, the driver 1 continues applying force to the hammer 22. As the hammer travel distance of the hammer 22 by the impact applied to the anvil 23 by the hammer 22 increases, the load applied to the driver 1 increases. That is, as the hammer travel distance of the hammer 22 by the impact applied to the anvil 23 by the hammer 22 increases, the variation amount A1 of the torque current X1 increases. That is, the variation amount A1 of the torque current X1 changes in accordance with the hammer travel distance of the hammer 22 by the impact applied to the anvil 23 by the hammer 22 at the time T1*a*. In other words, the variation amount A1 of the torque current X1 correlates with the hammer travel distance of the hammer 22 by the impact applied to the anvil 23 by the hammer 22 at the time T1*a*.

Thus, the travel distance measuring device 3 of the present embodiment measures the variation amount A1 of the torque current X1 in the period from when the hammer 22 applies impact to the anvil 23 to when the hammer 22 next applies impact to the anvil 23, and based on the variation amount A1 of the torque current X1 thus measured, the travel distance measuring device 3 measures, as the parameter relating to the hammer travel distance, the hammer travel distance itself. More specifically, the travel distance measuring device 3 of the present embodiment measures the variation amount A1 of the torque current X1 in the period from the time T1*a* at which the hammer 22 applies the impact to the anvil 23 to the time T2*a* at which the hammer 22 next applies the impact to the anvil 23, and based on the variation amount A1 of the torque current X1 thus measured, the travel distance measuring device 3 measures the hammer travel distance by the impact applied to the anvil 23 by the hammer 22 at the time T1*a*.

Specifically, the travel distance measuring device 3 of the present embodiment includes a current sensor configured to detect a torque current supplied to the driver 1 in accordance with the vector control performed by the controller 6. In the present embodiment, the current sensor of the travel distance measuring device 3 is integrated with a current sensor used for the vector control. This configuration has the advantage that the impact rotary tool 100 can estimate the torque value with an increased accuracy without being required to be provided with an additional sensor for sensing the hammer travel distance.

The travel distance measuring device 3 of the present embodiment performs a plurality of number of times of measurements of the variation amount A1 of the torque current X1 in one machining work task, and when the variation amount A1 of the torque current X1 shows an increasing tendency in the plurality of number of times of measurements, the travel distance measuring device 3 measures the hammer travel distance. More specifically, the travel distance measuring device 3 of the present embodiment measures the variation amount A1 of the torque current X1 each time the hammer 22 applies impact to the anvil 23 in one fastening work task, and when the variation amount A1 of the torque current X1 shows an increasing tendency, the travel distance measuring device 3 measures the hammer travel distance. In general, the fastening member has not been fastened at a time point at which a user starts the fastening work by using the impact rotary tool 100, and therefore, the anvil 23 rotates together with the fastening member, and thereby, the rotational angle of the fastening member of each time the hammer 22 applies impact to the anvil 23 increases. Thus, at the time point at which the fastening work is started, the hammer travel distance is short, but there may nonetheless be a case where the variation amount A1 of the torque current X1 increases. Once the variation amount A1 of the torque current X1 has increased, the variation amount A1 of the torque current X1 shows a reduction tendency until the fastening member is fastened to a certain extent. However, time elapses from the time point at which the user starts the fastening work by using the impact rotary tool 100 and the fastening member is thus fastened to a certain extent, and thereby, the rotational angle of the fastening member of each time the hammer 22 applies impact to the anvil 23 decreases, which increases the repulsive force of the anvil 23 to the impact to increase the hammer travel distance, and thus, the variation amount A1 of the torque current X1 for each impact shows the increasing tendency. This configuration enables the hammer travel distance to be measured based on the variation amount A1 of the torque current X1 at a time point at which the rotational angle of the fastening member of each time impact is applied decreases. That is, this configuration has the advantage that based on the variation amount A1 of the torque current X1, the hammer travel distance is measured with a further increased accuracy.

When the variation amount A1 of the torque current X1 in the plurality of number of times of measurements successively increases a predetermined number of times, the travel distance measuring device 3 of the present embodiment determines that the variation amount A1 shows the increasing tendency. More specifically, the travel distance measuring device 3 of the present embodiment stores history information on the variation amount A1 of the torque current X1 measured each time the hammer 22 applies impact to the anvil 23, and when the travel distance measuring device 3 successively determines a predetermine number of times that the variation amount A1 of the torque current X1 is greater than the variation amount A1 of the torque current X1 caused by the previous impact, the travel distance measuring device 3 determines that the variation amount A1 shows the increasing tendency. As used herein, the "predetermined number of times" is experientially set and is, for example, three times. That is, in the case of the "predetermined number of times" being set to three times, when the variation amount A1 of the torque current X1 measured in three successive times of impact successively increases, the travel distance measuring device 3 of the present embodiment determines that the variation amount A1 shows the increasing tendency. Note that the "predetermined number of times" in the present disclosure is not limited to this example. This configuration has the advantage that the hammer travel distance is measured with an increased accuracy regardless of the fastening member or the material for the fastening member.

(2-5) Rotational Velocity Measuring Device

The rotational velocity measuring device 4 measures the rotational velocity of the hammer 22. The rotational velocity measuring device 4 of the present embodiment measures, based on the number of revolutions of the driver 1, the rotational velocity of the hammer 22. The rotational velocity measuring device 4 detects the excitation current supplied to the driver 1 by the controller 6 and calculates, based on the excitation current thus detected, the number of revolutions of the driver 1. That is, the rotational velocity measuring device 4 includes a current sensor configured to detect the excitation current supplied to the driver 1 by the controller 6.

FIG. 3 shows changes with time in a calculated value X2 of the number of revolutions of the driver 1 and a target value X3 of the number of revolutions of the driver 1 during the period during which the impact rotary tool 100 performs the operation for the fastening work while causing the impact mechanism 2 to perform the impact operation. The calculated value X2 is calculated by the rotational velocity measuring device 4. The driver 1 is controlled according to the vector control performed by the controller 6. A set value R1 shown in FIG. 3 is a value of the number of revolutions set in advance by a worker such that the value is suitable for the fastening work done by the impact rotary tool 100. The controller 6 calculates the target value X3 such that the number of revolutions of the driver 1 reaches the set value R1.

As shown in FIG. 3, the calculated value X2 of the number of revolutions of the driver 1 varies each time the hammer 22 applies impact to the anvil 23. Thus, the rotational velocity measuring device 4 of the present embodiment measures, based on the calculated value X2 of the number of revolutions of the driver 1, the rotational velocity of the hammer 22, thereby measuring, with an increased accuracy, the rotational velocity of the hammer 22 which varies each time the hammer 22 applies impact to the anvil 23.

(2-6) Torque Estimator

The hammer travel distance when the hammer 22 applies impact to the anvil 23 depends on a physical parameter of the impact mechanism 2, the rotational velocity of the hammer 22, and the torque generated at the anvil 23 by the impact. As used herein, the "physical parameter of the impact mechanism 2" is a material, a dimension, or the like of each of the drive shaft 21, the hammer 22, the anvil 23, and the elastic member 24 included in the impact mechanism 2. That is, the "physical parameter of the impact mechanism 2" does not change depending on the fastening target or the fastening member but is uniquely determined for each impact rotary tool 100.

Thus, the torque estimator 5 estimates, based on the parameter relating to the hammer travel distance measured by the travel distance measuring device 3, the rotational velocity measured by the rotational velocity measuring device 4, and the physical parameter of the impact mechanism 2, the torque value representing the magnitude of a torque generated at the anvil 23 by the impact applied to the anvil 23 by the hammer 22. In the present embodiment, the torque estimator 5 estimates, based on the hammer travel distance measured by the travel distance measuring device 3, the rotational velocity measured by the rotational velocity measuring device 4, and the physical parameter of the impact mechanism 2, the torque value representing the magnitude of the torque generated at the anvil 23 by the impact applied to the anvil 23 by the hammer 22. More specifically, a learned model is generated by machine learning of the torque value in advance, where both the hammer travel distance and the rotational velocity of the hammer 22 are feature amounts, and the torque estimator 5 of the present embodiment estimates, based on the learned model, the torque value on the basis of the hammer travel distance measured by the travel distance measuring device 3 and the rotational velocity measured by the rotational velocity measuring device 4.

(3) Operation

Next, a torque estimation method of estimating a torque value representing the magnitude of a torque generated by impact applied by the impact rotary tool 100 will be described with reference to FIG. 4.

Figure 4:
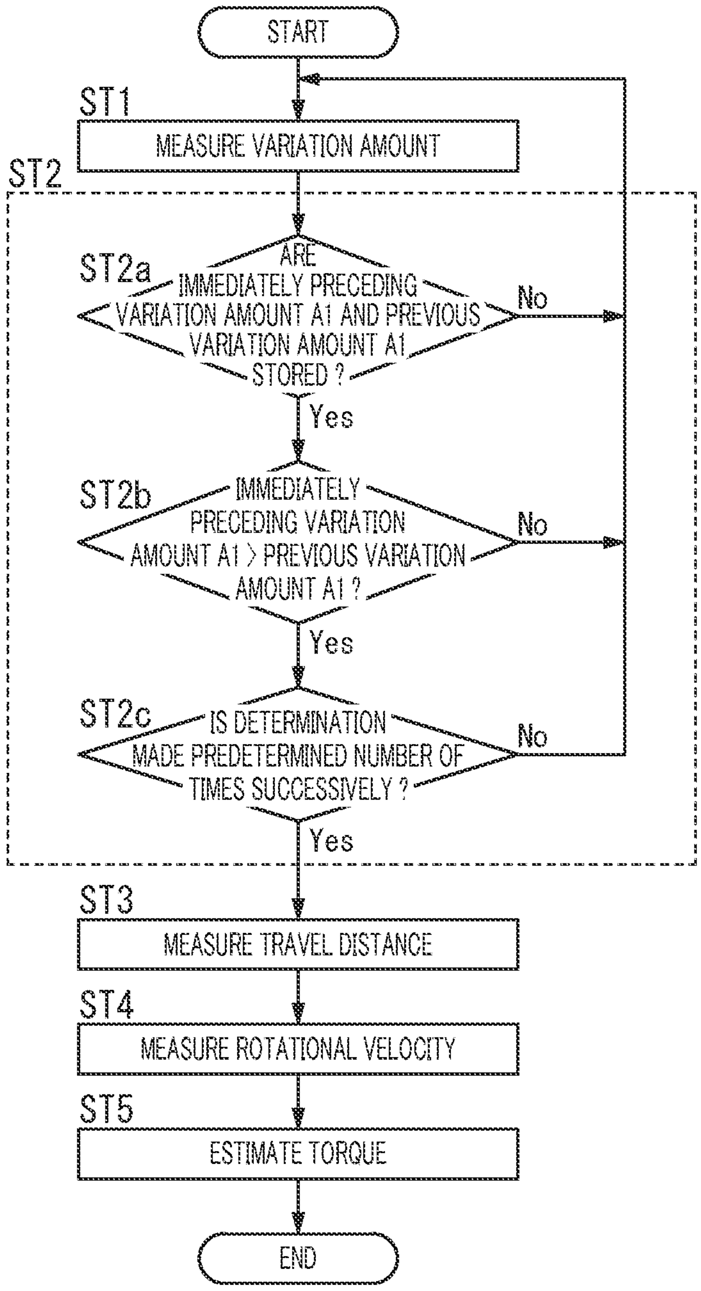
FIG. 4 is a flowchart of the torque estimation method.

As shown in FIG. 4, the torque estimation method includes a variation amount measurement step ST1, a determination step ST2, a travel distance measurement step ST3, a rotational velocity measurement step ST4, and a torque estimation step ST5.

The worker starts the fastening work by using the impact rotary tool 100, and then, in the variation amount measurement step ST1, the travel distance measuring device 3 measures the variation amount A1 of the torque current X1 in the period from when the hammer 22 applies impact to the anvil 23 to when the hammer 22 next applies impact to the anvil 23. More specifically, the travel distance measuring device 3 measures the variation amount A1 of the torque current X1 in the period from when the hammer 22 applies impact to the anvil 23 to when the hammer 22 next applies impact to the anvil 23, and the travel distance measuring device 3 stores the variation amount A1 of the torque current X1 as the history information.

Then, in the determination step ST2, the travel distance measuring device 3 determines whether or not the variation amount A1 of the torque current X1 in the plurality of number of times of measurements shows the increasing tendency. In the determination step ST2 of the present embodiment, the travel distance measuring device 3 determines whether or not the variation amount A1 of the torque current X1 successively increases the predetermined number of times in the plurality of number of times of measurements. The determination step ST2 of the present embodiment includes a first determination step ST2*a*, a second determination step ST2*b*, and a third determination step ST2*c*.

In the first determination step ST2*a*, the travel distance measuring device 3 determines whether or not both a variation amount A1 of the torque current X1 in immediately preceding impact and a variation amount A1 of the torque current X1 in previous impact are stored as the history information. As used herein, the "immediately preceding impact" is impact in which the variation amount A1 of the torque current X1 is measured in the variation amount measurement step ST1 executed before the determination step ST2 currently executed. Moreover, the "previous impact" used herein is impact of one time before the immediately preceding impact" of a plurality of number of times of impact repeatedly applied to the anvil 23.

When only the variation amount A1 of the torque current X1 in the immediately preceding impact is stored and the variation amount A1 of the torque current X1 in the previous impact is not stored (ST2*a*: No), the travel distance measuring device 3 measures again the variation amount A1 of the torque current X1 in the period from when the hammer 22 applies impact to the anvil 23 to when the hammer 22 next applies impact to the anvil 23 (ST1). In other words, when only the variation amount A1 of the torque current X1 in the immediately preceding impact is stored and the variation amount A1 of the torque current X1 in the previous impact is not stored (ST2*a*: No), the travel distance measuring device 3 measures the variation amount A1 of the torque current X1 in next impact. As used herein, "when only the variation amount A1 of the torque current X1 in the immediately preceding impact is stored and the variation amount A1 of the torque current X1 in the previous impact is not stored" assumes a case where the worker starts the fastening work, and then, the variation amount A1 of the torque current X1 in first impact is measured in the variation amount measurement step ST1, and the process proceeds to the first determination step ST2*a*.

In contrast, when both the variation amount A1 of the torque current X1 in the immediately preceding impact and the variation amount A1 of the torque current X1 in the previous impact are stored (ST2*a*: Yes), the travel distance measuring device 3 executes the second determination step ST2*b* of determining whether or not the variation amount A1 of the torque current X1 in the immediately preceding impact is greater than the variation amount A1 of the torque current X1 in the previous impact.

When the variation amount A1 of the torque current X1 in the immediately preceding impact is less than or equal to the variation amount A1 of the torque current X1 in the previous impact (ST2*b*: No), the travel distance measuring device 3 measures again the variation amount A1 of the torque current X1 in the period from when the hammer 22 applies impact to the anvil 23 to when the hammer 22 next applies impact to the anvil 23 (ST1). In other words, when the variation amount A1 of the torque current X1 in the immediately preceding impact is less than or equal to the variation amount A1 of the torque current X1 in the previous impact (ST2*b*: No), the travel distance measuring device 3 measures the variation amount A1 of the torque current X1 in next impact.

In contrast, when the variation amount A1 of the torque current X1 in the immediately preceding impact is greater than the variation amount A1 of the torque current X1 in the previous impact (ST2*b*: Yes), the travel distance measuring device 3 executes the third determination step ST2*c* of further determining whether or not it is successively determined the predetermined number of times that the variation amount A1 of the torque current X1 in the immediately preceding impact is greater than the variation amount A1 of the torque current X1 in the previous impact.

When the travel distance measuring device 3 does not successively determine the predetermined number of times that the variation amount A1 of the torque current X1 in the immediately preceding impact is greater than the variation amount A1 of the torque current X1 in the previous impact (ST2*c*: No), the travel distance measuring device 3 measures again the variation amount A1 of the torque current X1 in the period from when the hammer 22 applies impact to the anvil 23 to when the hammer 22 next applies impact to the anvil 23 (ST1). In other words, when the travel distance measuring device 3 does not successively determine the predetermined number of times that the variation amount A1 of the torque current X1 in the immediately preceding impact is greater than the variation amount A1 of the torque current X1 in the previous impact (ST2*c*: No), the travel distance measuring device 3 measures the variation amount A1 of the torque current X1 in next impact.

In contrast, when the travel distance measuring device 3 successively determines the predetermined number of times that the variation amount A1 of the torque current X1 in the immediately preceding impact is greater than the variation amount A1 of the torque current X1 in the previous impact (ST2*c*: Yes), the travel distance measuring device 3 executes the travel distance measurement step ST3 of measuring, based on the variation amount A1 of the torque current X1 in the immediately preceding impact, the hammer travel distance. That is, in the travel distance measurement step ST3, the travel distance measuring device 3 measures a parameter relating to the hammer travel distance through which on application of the impact to the anvil 23 by the hammer 22, the hammer 22 moves away from the anvil 23 along the axial direction D1 from a location of the application of the impact to the anvil 23 by the hammer 22. In the travel distance measurement step ST3, the travel distance measuring device 3 measures the hammer travel distance through which on application of the impact to the anvil 23 by the hammer 22, the hammer 22 moves away from the anvil 23 along the axial direction D1 from a location of the application of the impact to the anvil 23 by the hammer 22. Then, in the rotational velocity measurement step ST4, the rotational velocity measuring device 4 measures the rotational velocity of the hammer 22.

Then, in the torque estimation step ST5, the torque estimator 5 estimates, based on the hammer travel distance measured by the travel distance measuring device 3 in the travel distance measurement step ST3 and the rotational velocity measured by the rotational velocity measuring device 4 in the rotational velocity measurement step ST4, a torque value representing the magnitude of a torque generated at the anvil 23 by the immediately preceding impact. That is, in the torque estimation step ST5, the torque estimator 5 estimates, based on at least the parameter relating to the hammer travel distance, the torque value representing the magnitude of a torque generated at the anvil 23 by the immediately preceding impact.

After the torque estimation step ST5, the travel distance measuring device 3 measures again the variation amount A1 of the torque current X1 in the period from when the hammer 22 applies impact to the anvil 23 to when the hammer 22 next applies impact to the anvil 23 (ST1). In other words, after the torque estimation step ST5, the travel distance measuring device 3 measures the variation amount A1 of the torque current X1 in next impact. Thereafter, the impact rotary tool 100 does not execute the determination step ST2 but executes the travel distance measurement step ST3, the rotational velocity measurement step ST4, and the torque estimation step ST5 to estimate the torque value. That is, when the impact rotary tool 100 once determines, in the third determination step ST2*c* after the worker starts the fastening work, that the travel distance measuring device 3 successively determines the predetermined number of times that the variation amount A1 of the torque current X1 in the immediately preceding impact is greater than the variation amount A1 of the torque current X1 in the previous impact, the impact rotary tool 100 does not execute the determination step ST2. The impact rotary tool 100 repeats the variation amount measurement step ST1, the travel distance measurement step ST3, the rotational velocity measurement step ST4, and the torque estimation step ST5 to repeatedly estimate the torque value until the worker ends the fastening work.

(4) Variations

The embodiment described above is a mere example of various embodiments of the present disclosure. Various modifications may be made to the embodiment described above depending on design and the like as long as the object of the present disclosure is achieved. Moreover, functions similar to those of the travel distance measuring device 3, the rotational velocity measuring device 4, the torque estimator 5, and the controller 6 of the impact rotary tool 100 according to the embodiment described above may be implemented by, for example, a computer program or a non-transitory recording medium recording the program. A program according to an aspect is a program configured to cause a computer system to execute the torque estimation method in the embodiment described above.

In the embodiment described above, the variation amount A1 of the torque current X1 in the period from the time T1*a* at which the hammer 22 applies impact to the anvil 23 to the time T2*a* at which the hammer 22 applies impact to the anvil 23 again is defined as the difference between the local minimal value Via at the time Tia and the local maximum value V1*b* at the time T1*b*. However, the variation amount A1 of the torque current X1 in the period from the time T1*a* at which the hammer 22 applies impact to the anvil 23 to the time T2*a* at which the hammer 22 applies impact to the anvil 23 again may be defined as a difference between the local maximum value V1*b* at the time T1*b* and a local minimal value V2*a* at the time T2*a*. That is, the variation amount A1 of the torque current X1 in the period from when the hammer 22 applies impact to the anvil 23 to when the hammer 22 next applies impact to the anvil 23 may be defined as a difference between a local maximum value when the hammer 22 retreats at most and a local minimal value when the hammer 22 applies the impact again to the anvil 23.

The travel distance measuring device 3 of the embodiment described above measures based on the variation amount A1 of the torque current X1 thus measured, the hammer travel distance. However, the travel distance measuring device 3 may measure the hammer travel distance by measuring the hammer travel distance. That is, the travel distance measuring device 3 may include a location sensor configured to measure the distance through which on application of the impact to the anvil 23 by the hammer 22, the hammer 22 moves away from the anvil 23 along the axial direction of the drive shaft 21 from a location where the hammer 22 applies the impact to the anvil 23.

Moreover, the travel distance measuring device 3 of the embodiment described above measures, as the parameter relating to the hammer travel distance, the hammer travel distance itself. However, the travel distance measuring device 3 may measure, as the parameter relating to the hammer travel distance, the variation amount A1 of the torque current X1. That is, the torque estimator 5 of the embodiment described above estimates, based on the hammer travel distance and the rotational velocity of the hammer 22, the torque value. However, the torque estimator 5 may estimate the torque value on the basis of the variation amount A1 of the torque current X1 and the rotational velocity of the hammer 22. More specifically, a learned model is generated by machine learning of the torque value in advance, where both the variation amount A1 of the torque current X1 and the rotational velocity of the hammer 22 are feature amounts, and the torque estimator 5 may estimate, based on the learned model, the torque value on the basis of the variation amount A1 of the torque current X1 measured by the travel distance measuring device 3 and the rotational velocity measured by the rotational velocity measuring device 4. In sum, when the torque estimator 5 estimates the torque value, the torque estimator 5 does not have to measure the hammer travel distance from the variation amount A1 of the torque current X1 but may directly estimate the torque value from the variation amount A1 of the torque current X1. That is, the "parameter relating to the hammer travel distance" as used in the present disclosure may be the hammer travel distance itself or may be a value (e.g., the variation amount A1 of torque current X1) which varies in accordance with the hammer travel distance.

Moreover, the travel distance measuring device 3 of the embodiment described above performs a plurality of number of times of measurements of the variation amount A1 of the torque current X1 in one machining work task, and when the variation amount A1 of the torque current X1 shows an increasing tendency in the plurality of number of times of measurements, the travel distance measuring device 3 measures the hammer travel distance. However, the travel distance measuring device 3 may measure the hammer travel distance after the hammer applies impact to the anvil a predetermined number of times in one machining work task. More specifically, the travel distance measuring device 3 counts the number of times that the hammer applies impact to the anvil after the fastening work is started, and when the number of times reaches a predetermined number of times, the travel distance measuring device 3 may measure the hammer travel distance. As used herein, the "predetermined number of times" is experientially set, and is, for example, ten times. That is, in the case of the "predetermined number of times" being set to ten times, the travel distance measuring device 3 counts the number of times that the hammer applies impact to the anvil after the fastening work is started, and when the number of times reaches ten times, the travel distance measuring device 3 measures the hammer travel distance. Note that the "predetermined number of times" is not limited to ten times. This configuration has the advantage that the travel distance measuring device 3 measure the hammer travel distance with a further increased accuracy without executing a complicated determination process.

The rotational velocity measuring device 4 of the embodiment described above measures the rotational velocity of the hammer 22 but may measure the rotational velocity of the drive shaft 21. That is, the rotational velocity measuring device 4 at least measures the rotational velocity of at least one of the drive shaft 21 or the hammer 22. Moreover, the torque estimator 5 at least estimates, based on the hammer travel distance and the rotational velocity of at least one of the drive shaft 21 or the hammer 22, the torque value representing the magnitude of the torque generated at the anvil 23 by the impact applied to the anvil 23 by the hammer 22.

The torque estimator 5 of the embodiment described above estimates, based on the hammer travel distance measured by the travel distance measuring device 3 and the rotational velocity measured by the rotational velocity measuring device 4, the torque value representing the magnitude of a torque generated at the anvil 23 by the impact applied to the anvil 23 by the hammer 22. However, the torque estimator 5 may estimate, based on the hammer travel distance measured by the travel distance measuring device 3 and the rotational velocity of at least one of the drive shaft 21 or the hammer 22 calculated by a set value R1 (see FIG. 3) of the number of revolutions of the driver 1 set in advance by the worker, the torque value representing the magnitude of a torque generated at the anvil 23 by the impact applied to the anvil 23 by the hammer 22. That is, the rotational velocity of at least one of the drive shaft 21 or the hammer 22 may be measured by the rotational velocity measuring device 4 or may be calculated by the set value R1 of the number of revolutions of the driver 1. In sum, the impact rotary tool 100 does not have to include the rotational velocity measuring device 4, and the torque estimator 5 at least estimates, based on at least the hammer travel distance measured by the travel distance measuring device 3, the torque value representing the magnitude of the torque generated at the anvil 23 by the impact applied to the anvil 23 by the hammer 22.

SUMMARY

An impact rotary tool (100) according to a first aspect includes a driver (1), a drive shaft (21), a hammer (22), an anvil (23), a travel distance measuring device (3), and a torque estimator (5). The driver (1) is configured to perform a turning operation. The drive shaft (21) is configured to be turned by the driver (1). The hammer (22) is configured to be fitted to an outer perimeter of the drive shaft (21) such that the hammer (22) is movable in an axial direction (D1) of the drive shaft (21) and rotatable in a turning direction in which the drive shaft (21) turns. The anvil (23) is configured to receive impact applied by the hammer (22) in the turning direction. The travel distance measuring device (3) is configured to measure a parameter relating to a hammer travel distance through which on application of the impact to the anvil (23) by the hammer (22), the hammer (22) moves away from the anvil (23) along the axial direction from a location of application of the impact to the anvil (23) by the hammer (22). The torque estimator (5) is configured to estimate, based on at least the parameter relating to the hammer travel distance, a torque value generated by the impact.

This aspect has the advantages of being able to accurately estimate the torque value.

An impact rotary tool (100) of a second aspect referring to the first aspect further includes a rotational velocity measuring device (4). The rotational velocity measuring device (4) is configured to measure a rotational velocity of at least one of the drive shaft (21) or the hammer (22). The torque estimator (5) is configured to estimate the torque value on a basis of the parameter relating to the hammer travel distance and the rotational velocity, the torque value.

This aspect has the advantage that the torque value is estimated with a further increased accuracy in consideration of a variation in the rotational velocity of at least one of the drive shaft (21) or the hammer (22).

An impact rotary tool (100) of a third aspect referring to the first or second aspect further includes a controller (6) configured to control the driver (1) in accordance with vector control. The driver (1) is configured to be supplied with a torque current (X1) in accordance with the vector control performed by the controller (6). The travel distance measuring device (3) is configured to: measure a variation amount (A1) of the torque current (X1) in a period from when the hammer (22) applies impact to the anvil (23) to when the hammer (22) next applies impact to the anvil (23); and measure, as the parameter relating to the hammer travel distance, the hammer travel distance itself, the hammer travel distance being measured based on the variation amount (A1).

This aspect has the advantage of being able to accurately estimate the torque value without being required to be provided with an additional sensor for sensing the hammer travel distance.

In an impact rotary tool (100) of a fourth aspect referring to a third aspect, the travel distance measuring device (3) is configured to perform a plurality of number of times of measurements of the variation amount (A1) in one machining work task. The travel distance measuring device (3) is configured to measure the hammer travel distance when the variation amount (A1) shows an increasing tendency in the plurality of number of times of measurements.

This aspect has the advantage that the hammer travel distance is measured with a further increased accuracy on the basis of the variation amount (A1) of the torque current (X1).

In an impact rotary tool (100) of a fifth aspect referring to the fourth aspect, the travel distance measuring device (3) is configured to, when the variation amount (A1) successively increases a predetermined number of times in the plurality of number of times of measurements, determine that the variation amount (A1) shows the increasing tendency.

This aspect has the advantage that the hammer travel distance is measured with a further increased accuracy regardless of the fastening member or the material for the fastening member.

In an impact rotary tool (100) of a sixth aspect referring to the third aspect, the travel distance measuring device (3) is configured to measure the hammer travel distance after the hammer (22) applies impact to the anvil (23) a predetermined number of times in one machining work task.

This aspect has the advantage that the travel distance measuring device (3) measures the hammer travel distance with a further increased accuracy without executing a complicated determination process.

A torque estimation method of a seventh aspect is a torque estimation method of estimating a torque value generated by impact applied by an impact rotary tool including a driver (1), a drive shaft (21), a hammer (22), and an anvil (23) generates. The driver (1) is configured to perform a turning operation. The drive shaft (21) is configured to be turned by the driver (1). The hammer (22) is configured to be fitted to an outer perimeter of the drive shaft (21) such that the hammer (22) is movable in an axial direction (D1) of the drive shaft (21) and rotatable in a turning direction in which the drive shaft (21) turns. The anvil (23) is configured to receive impact applied by the hammer (22) in the turning direction. The torque estimation method includes a travel distance measurement step (ST3) and a torque estimation step (ST5). The travel distance measurement step (ST3) includes measuring a parameter relating to a hammer travel distance through which on application of the impact to the anvil (23) by the hammer (22), the hammer (22) moves away from the anvil (23) along the axial direction (D1) from a location of the application of the impact to the anvil (23) by the hammer (22). The torque estimation step (ST5) includes, estimating, based on at least the parameter relating to the hammer travel distance, a torque value generated by the impact.

This aspect has the advantage of being able to accurately estimate the torque value without using a dedicated impact rotary tool (100).

A non-transitory recording medium of an eighth aspect is a non-transitory recording medium recording a program configured to cause a computer system to execute the torque estimation method of the seventh aspect.

This aspect has the advantages of being able to accurately estimate the torque value.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An impact rotary tool comprising:

a driver configured to perform a turning operation;

a drive shaft configured to be turned by the driver;

a hammer configured to be fitted to an outer perimeter of the drive shaft such that the hammer is movable in an axial direction of the drive shaft and rotatable in a turning direction in which the drive shaft turns;

an anvil configured to receive impact applied by the hammer in the turning direction;

a travel distance measuring device configured to measure a parameter relating to a hammer travel distance through which on application of the impact to the anvil by the hammer, the hammer moves away from the anvil along the axial direction from a location of the application of the impact to the anvil by the hammer;

a torque estimator configured to estimate, based on at least the parameter, a torque value generated by the impact, and a controller configured to control the driver in accordance with vector control, wherein the driver is configured to be supplied with a torque current in accordance with the vector control performed by the controller, and the travel distance measuring device is configured to measure a variation amount of the torque current in a period from when the hammer applies impact to the anvil to when the hammer next applies impact to the anvil and measure, as the parameter, the hammer travel distance itself, the hammer travel distance being measured based on the variation amount.

2. The impact rotary tool of claim 1, further comprising a rotational velocity measuring device configured to measure a rotational velocity of at least one of the drive shaft or the hammer, wherein the torque estimator is configured to estimate the torque value on a basis of the parameter relating to the hammer travel distance and the rotational velocity.

3. The impact rotary tool of claim 1, wherein the travel distance measuring device is configured to perform a plurality of number of times of measurements of the variation amount in one machining work task and measure the hammer travel distance when the variation amount shows an increasing tendency in the plurality of number of times of measurements.

4. The impact rotary tool of claim 3, wherein the travel distance measuring device is configured to, when the variation amount successively increases a predetermined number of times in the plurality of number of times of measurements, determine that the variation amount shows the increasing tendency.

5. The impact rotary tool of claim 1, wherein the travel distance measuring device is configured to measure the hammer travel distance after the hammer applies impact to the anvil a predetermined number of times in one machining work task.

6. A torque estimation method of estimating a torque value generated by an impact rotary tool including: a driver configured to perform a turning operation; a drive shaft configured to be turned by the driver; a hammer configured to be fitted to an outer perimeter of the drive shaft such that the hammer is movable in an axial direction of the drive shaft and rotatable in a turning direction in which the drive shaft turns; an anvil configured to receive impact applied by the hammer in the turning direction, the torque value being produced by the impact; and a controller configured to control the driver in accordance with vector control, the torque estimation method comprising:

a travel distance measurement step of measuring a parameter relating to a hammer travel distance through which on application of the impact to the anvil by the hammer, the hammer moves away from the anvil along the axial direction from a location of the application of the impact to the anvil by the hammer; and a torque estimation step of estimating, based on at least the parameter, a torque value generated by the impact, wherein the driver is configured to be supplied with a torque current in accordance with the vector control performed by the controller, and the travel distance measurement step includes measuring a variation amount of the torque current in a period from when the hammer applies impact to the anvil to when the hammer next applies impact to the anvil and measuring, as the parameter, the hammer travel distance itself, the hammer travel distance being measured based on the variation amount.

7. A non-transitory recording medium recording a program configured to cause a computer system to execute the torque estimation method of claim 6.

* * * * *